United States Patent [19]

Freyman et al.

[11] Patent Number: 5,979,760
[45] Date of Patent: Nov. 9, 1999

[54] SCANNER WITH LINEAR ACTUATOR BASED LENS POSITIONING SYSTEM

[75] Inventors: Christopher A. Freyman, Allentown; Richard A. DiDomizio, Hatfield; John F. Iannuzzi, Roslyn, all of Pa.

[73] Assignee: Accu-Sort Systems, Inc., Telford, Pa.

[21] Appl. No.: 08/883,953

[22] Filed: Jun. 27, 1997

[51] Int. Cl.⁶ .................................................. G06K 7/10
[52] U.S. Cl. ................ 235/454; 235/462.2; 235/462.23; 235/462.32; 235/462.43
[58] Field of Search ............................. 235/454, 462.17, 235/462.2, 462.21, 462.23, 462.26, 461.32, 462.33, 462.42, 462.43, 472.01, 470

[56] References Cited

U.S. PATENT DOCUMENTS

| | | | |
|---|---|---|---|
| 4,920,255 | 4/1990 | Gabeler | 235/462.23 |
| 5,015,833 | 5/1991 | Shepard et al. | 235/472.01 |
| 5,144,120 | 9/1992 | Krichever et al. | 235/472.01 |
| 5,245,172 | 9/1993 | Esslinger et al. | 250/201 |
| 5,266,787 | 11/1993 | Mazz et al. | 235/462.25 |
| 5,386,105 | 1/1995 | Quinn et al. | 235/462 |
| 5,397,885 | 3/1995 | Massieu et al. | 235/462 |
| 5,414,940 | 5/1995 | Sturdevant | 364/559 X |
| 5,581,068 | 12/1996 | Shepard et al. | 235/462 |
| 5,679,941 | 10/1997 | Iizaka et al. | 235/383 |

FOREIGN PATENT DOCUMENTS 2-7182  1/1990  Japan.

OTHER PUBLICATIONS

Signetics—Application Notes—Feb. 1987, pp. 5–343, 5–347 and 5–378.

*Primary Examiner*—Michael G. Lee
*Attorney, Agent, or Firm*—Volpe and Koenig, P.C.

[57] ABSTRACT

A scanner for reading barcode symbologies having a focusing illuminating source. The scanner uses a coherent light source for illuminating the coded symbol during a scan and a detector for collecting the reflected light energy from the coded symbol. Both the illuminating and collecting devices include lenses which are in variable spacial relationship with each other. The scanner varies the relationship between the light source and associated focusing lens to provide the narrowest focused beam at the barcode location.

17 Claims, 15 Drawing Sheets

SCANNER WITH LINEAR ACTUATOR BASED LENS POSITIONING SYSTEM

BACKGROUND OF THE INVENTION

1. Field of the Invention

This invention generally relates to optical lens positioning systems. More particularly, the invention relates to a system of focusing lenses with a linear actuator and position sensing means in a lightweight compact assembly.

2. Description of the Related Art

The most common point of sale device (POSD) used today is a laser barcode scanner. The system relies upon a machine readable label printed on most products by a plurality of manufacturers. The label is a series of parallel bars of varying widths, encoding numerical information known as the Universal Product Code (UPC). In operation, the device scans a focused laser beam back and forth across the label many times each second in a linear or intricate pattern. A detector, sensitive only to the laser wavelength, detects the variations in light reflected from the dark and light bands of the label and converts them into electrical signals. When the label is scanned, the reflected light energy is processed and the price of the identified item is posted.

The ability of a laser beam to deliver high power densities to a small area makes the laser attractive for this application. The high degree of transverse coherence permits the light from a laser to be focused onto a much smaller area than the light from a more conventional source.

Related to the spot size of the beam is the distance, and the region of the focus spot, over which the beam diameter remains small. This distance, known as the depth of field, is important in a scanning system, for determining where the object can be positioned without having to refocus. The depth of field is somewhat arbitrary in that it depends on the beam focus tolerance that one chooses to apply. However, a large depth of field is not compatible with a small focused spot size. Due to this limitation, to use a laser in an application requiring a large depth of field while requiring a small laser spot size necessitates refocusing the laser beam.

FIG. 1 shows a simple relationship of a light source 17 and a double convex or condenser lens 19. The converging rays exiting the lens 21a, 21b, 21c form a waste 23 and then diverge again 21c, 21b, 21a.

The laser beam used in a scanning device is optically modified usually by a lens containing more than one element to form a waste shaped beam in which the width of the beam diminishes with distance until reaching a minimum, or waste and then increases. The beam is focused by the last element of the combination lens so that its desired spot size or waste is achieved at the object or barcode distance.

As shown in FIG. 2, the most common method to increase the depth of field 25 of a lens 19 is to reduce its lens aperture 27 with a stop 29. Some of the rays 21a, 21c entering the lens are blocked by the stop 29. The converging rays exiting the lens 21d, 21b, 21e have been reduced but create a greater depth of field 25 located at the waste 23. The source 17 will remain focused in dependence upon the stop 29 and the focal length of the lens. However, by increasing or decreasing the stop 29 provides only a limited depth of field.

To better the range of focus beyond a preset depth of field requires refocusing the lens. One method to focus a projected beam is by using a stepper motor to drive a mechanism holding at least one element of the lens optics. However, the use of prior art stepper motors for lens positioning leaves much to be desired since stepper motors have a finite step angle which ultimately results in a series of finite positions.

Another method to provide the motive force to position a lens element is to use a magnetic coil or linear actuator, well known in the art. Similarly, the prior art attempts to use linear actuators resulted in increased mechanical complexity with awkward arrangements of linkages to position the optics and provide corrective feedback.

In the alternative, to displace the light source from the optics thereby achieving the same result would require an even more complicated mechanical approach. In order to decrease the likelihood of errors and thereby increasing the efficiency of laser barcode scanners, it is desirable to have a simple, accurate and inexpensive focusing means for laser scanners.

SUMMARY OF THE INVENTION

The present invention relates to a scanner for reading barcode symbologies. The invention uses a coherent light source for illuminating the coded symbol during a scan and a detecting means for collecting the reflected light energy from the coded symbol. Both the illuminating and collecting means include lenses which are in variable spacial relationship with each other. The present invention varies the relationship between the light source and the associated focusing lens to provide the narrowest focused beam at the barcode location.

Accordingly, it is an object of the invention to provide a barcode scanning device having a variable focusing illuminating means.

Others objects and advantages will become apparent to those skilled in the art after reading the detailed description of the presently preferred embodiment.

DETAILED DESCRIPTION OF THE PREFERRED EMBODIMENT

Figure 1:
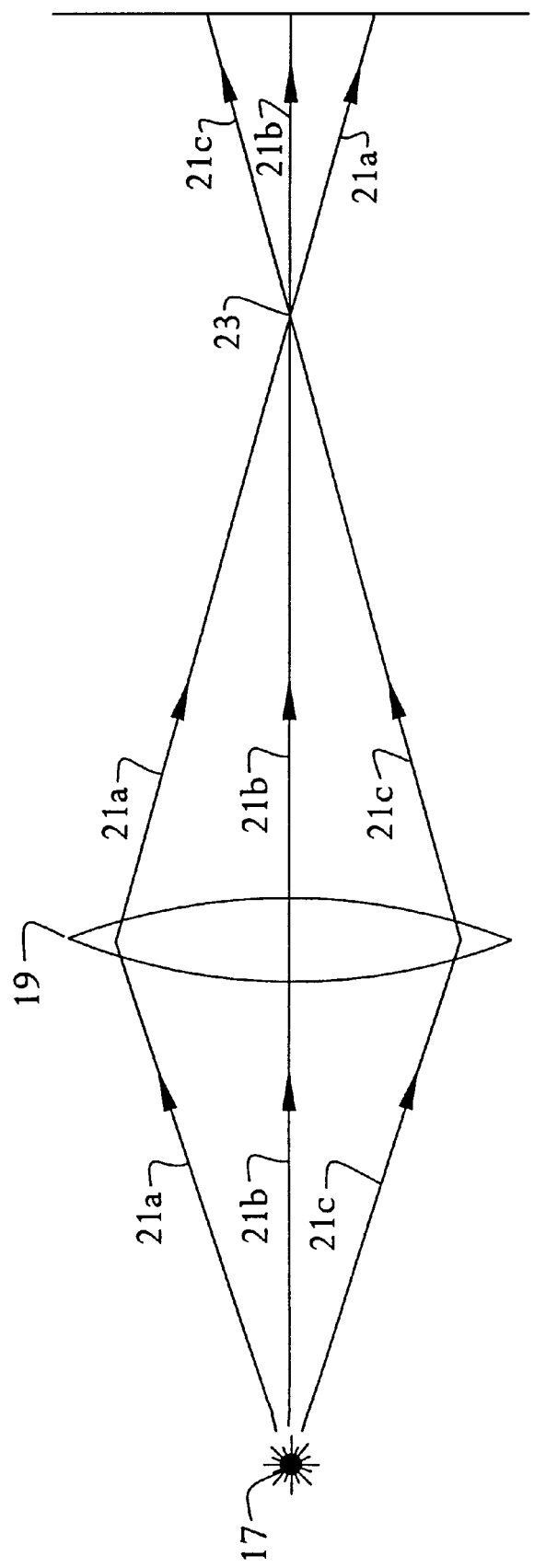
FIG. 1 is a prior art illustration of a simple lens system.
Figure 2:
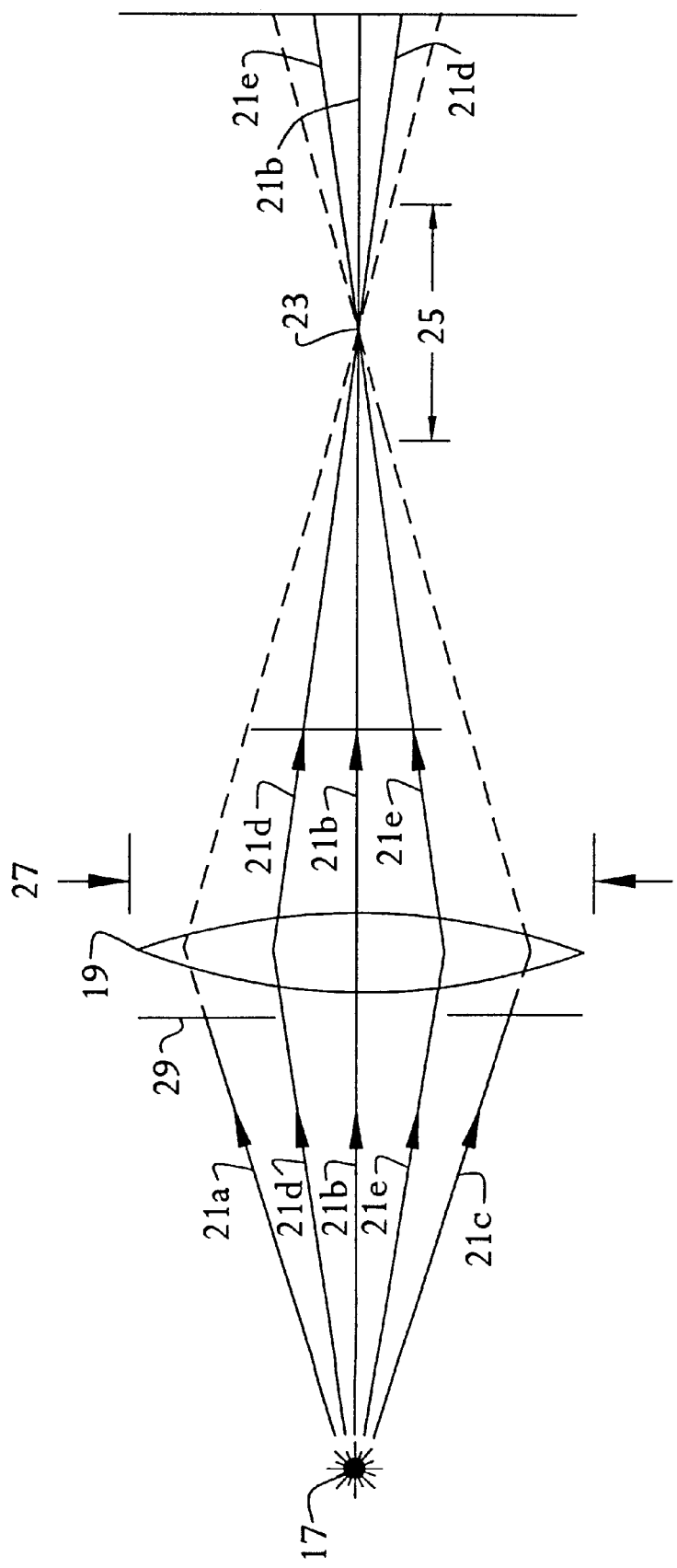
FIG. 2 is a prior art illustration of a simple lens system with an aperture stop.

The preferred embodiment will be described with reference to the drawing figures where like numerals represent like elements throughout.

Figure 3:
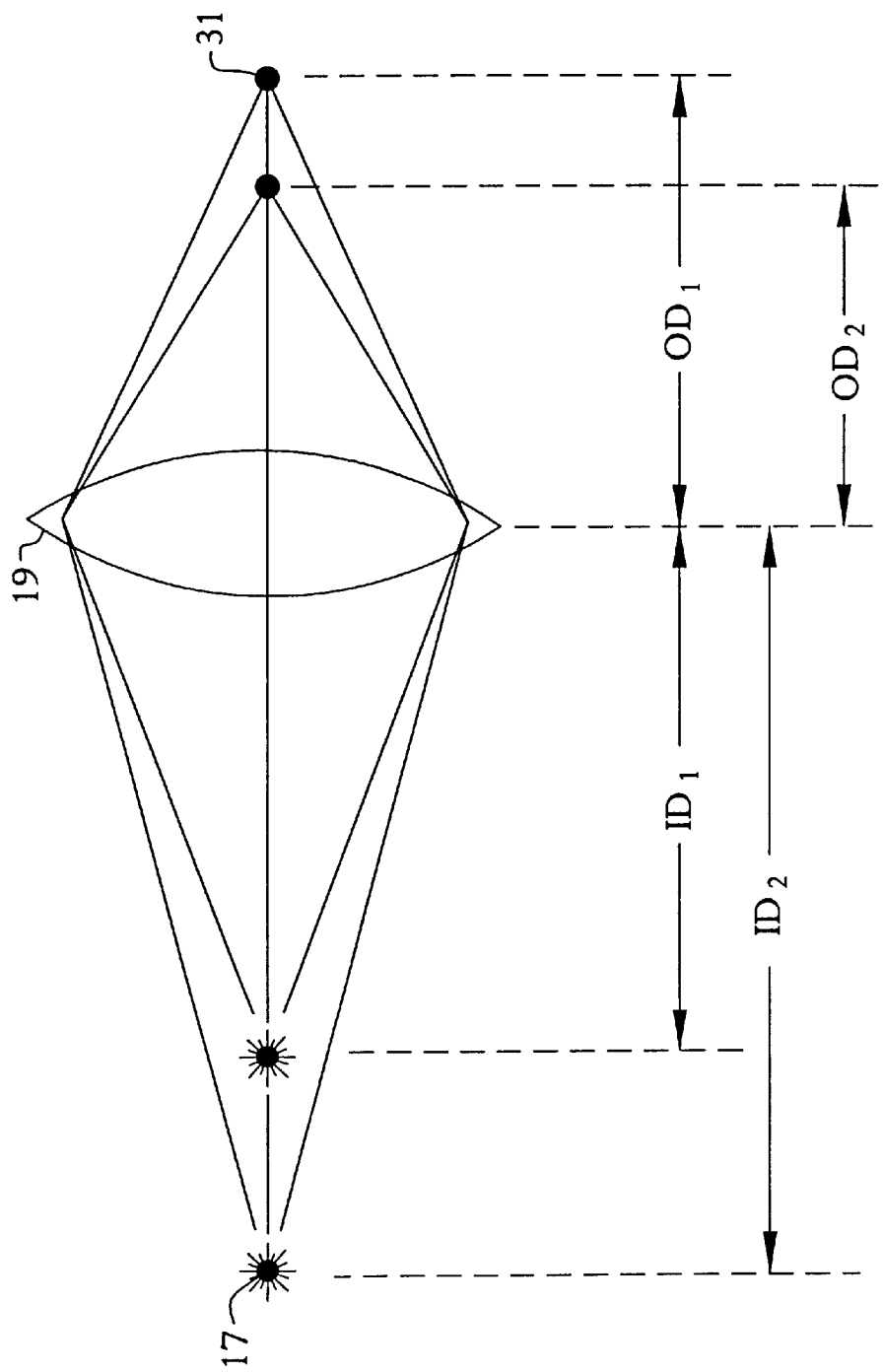
FIG. 3 is a prior art illustration of the relationships between object distance and image distance for a simple lens system.

Referring to FIG. 3, it can be shown that the further a barcode 31 to be scanned is from a lens 19, the closer a light source 17 must be to the optics to remain in focus. The inverse then holds true that the closer the barcode 31 is to the lens 19, the further the light source 17 must be from the lens 19.

For a given lens focal length F, it can be shown that the object distance and the image distance are related by the thin lens formula:

$$\frac{1}{OD_1} + \frac{1}{ID_1} = \frac{1}{F}, \text{ and} \quad \text{Equation 1}$$

$$\frac{1}{OD_2} + \frac{1}{ID_2} = \frac{1}{F}. \quad \text{Equation 2}$$

If the barcode 31 is placed between distance $OD_1$ and distance $OD_2$, the light source must be moved from $ID_2$ to $ID_1$.

Figure 4:
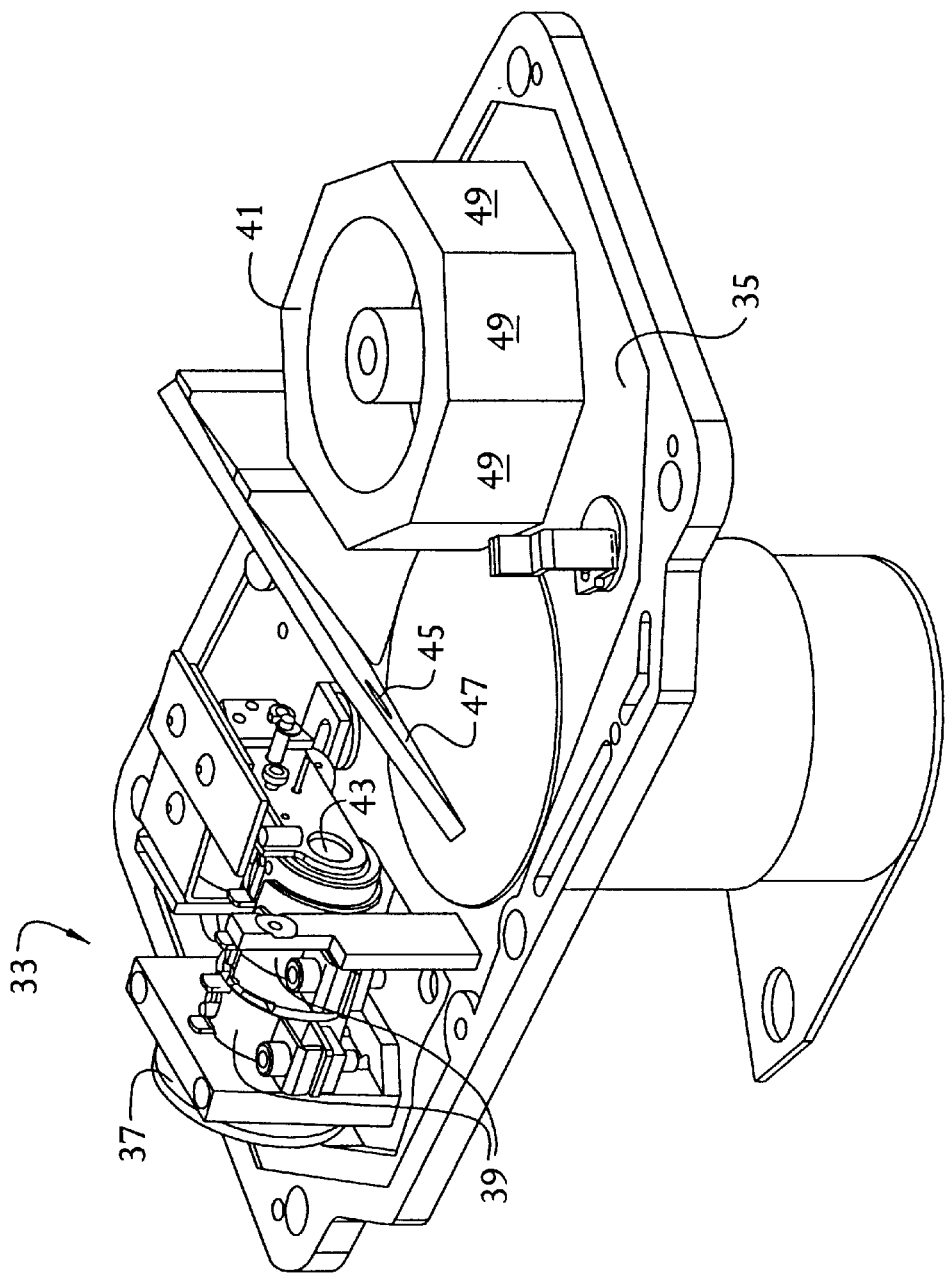
FIG. 4 is a top perspective view of a laser barcode scanner incorporating the preferred embodiment.

As shown in FIG. 4, a barcode scanner 33 taught in accordance with the present invention includes a plinth 35, laser diode assembly 37, a multi-element lens assembly 39, a multi-faceted rotating mirrored wheel 41 and a detector assembly (not shown). The laser 37 produces a coherent, collimated beam which is passed through the separate elements of the multi-element lens 39 and through a final, movable element 43 which focuses the beam. The beam then passes through an aperture 45 in a reflecting planar mirror 47 to the revolving multi-faceted mirrored wheel 41. The mirrored wheel 41 is driven by a motor (not shown) which moves the beam as it is reflected from each facet 49 of the turning mirrored wheel 41. This produces a series of continuous beams, which exit through a window of the barcode scanner (not shown). This method of producing a continuous scanning beam is familiar to those skilled in the art.

A photodiode (not shown) is mounted in a housing and directed toward the planar mirror 47. As the mirrored wheel 41 turns, the field of view is directed to positions corresponding with the series of scan beams. The photodetector outputs an analog voltage in response to the reflected light intensity. The photodetector field of view is aligned perpendicularly to the plane of the laser beam and is directed at the mirrored wheel 41 via the angled planar mirror 47.

Figure 5A:
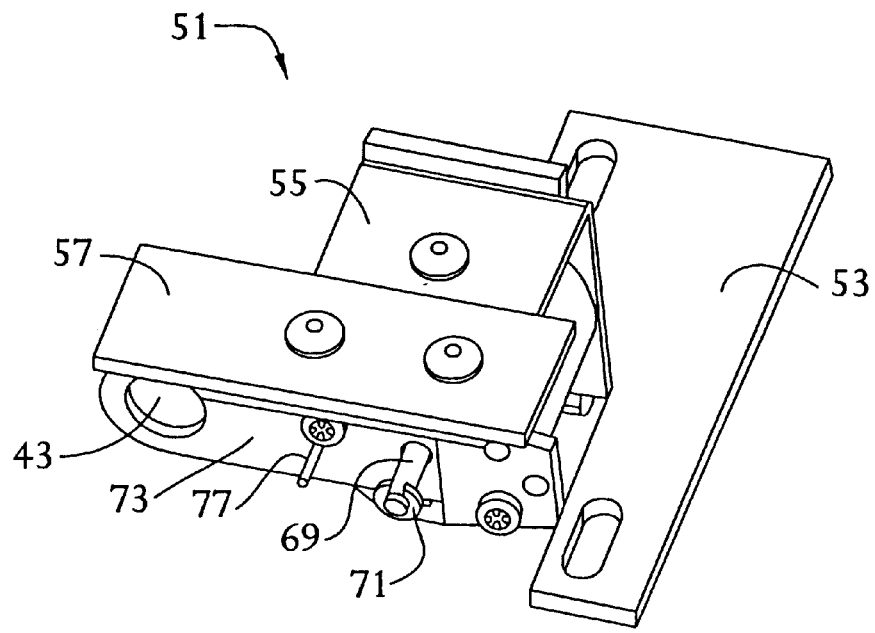
FIG. 5A is a top perspective view of the preferred embodiment.
Figure 5B:
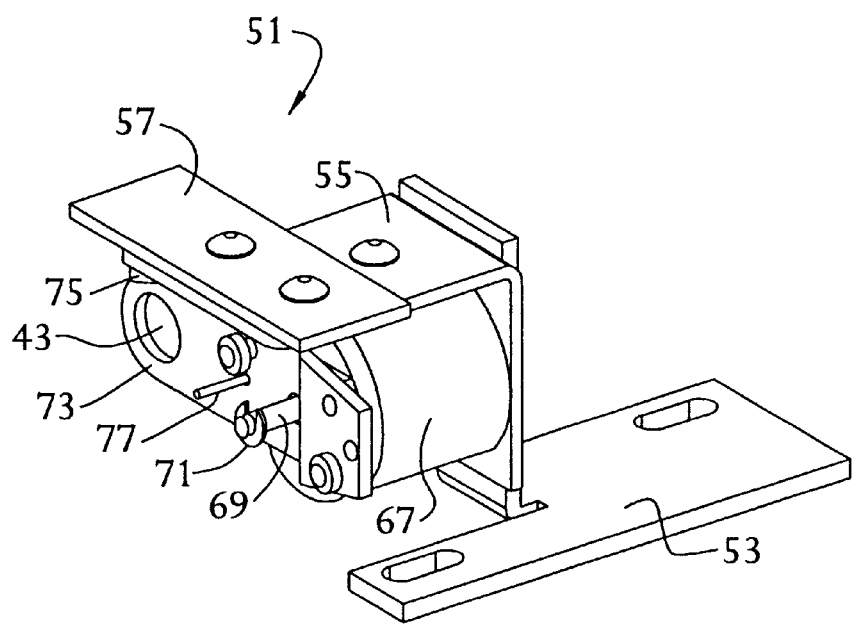
FIG. 5B is another perspective view from a different viewing angle of the preferred embodiment.

Now referring to FIGS. 5A–5B, a linear actuator based lens positioning system 51 taught in accordance with the present invention is shown in two different perspective views. The positioning mechanism is part of the laser illuminator for the barcode scanner.

Figure 6:
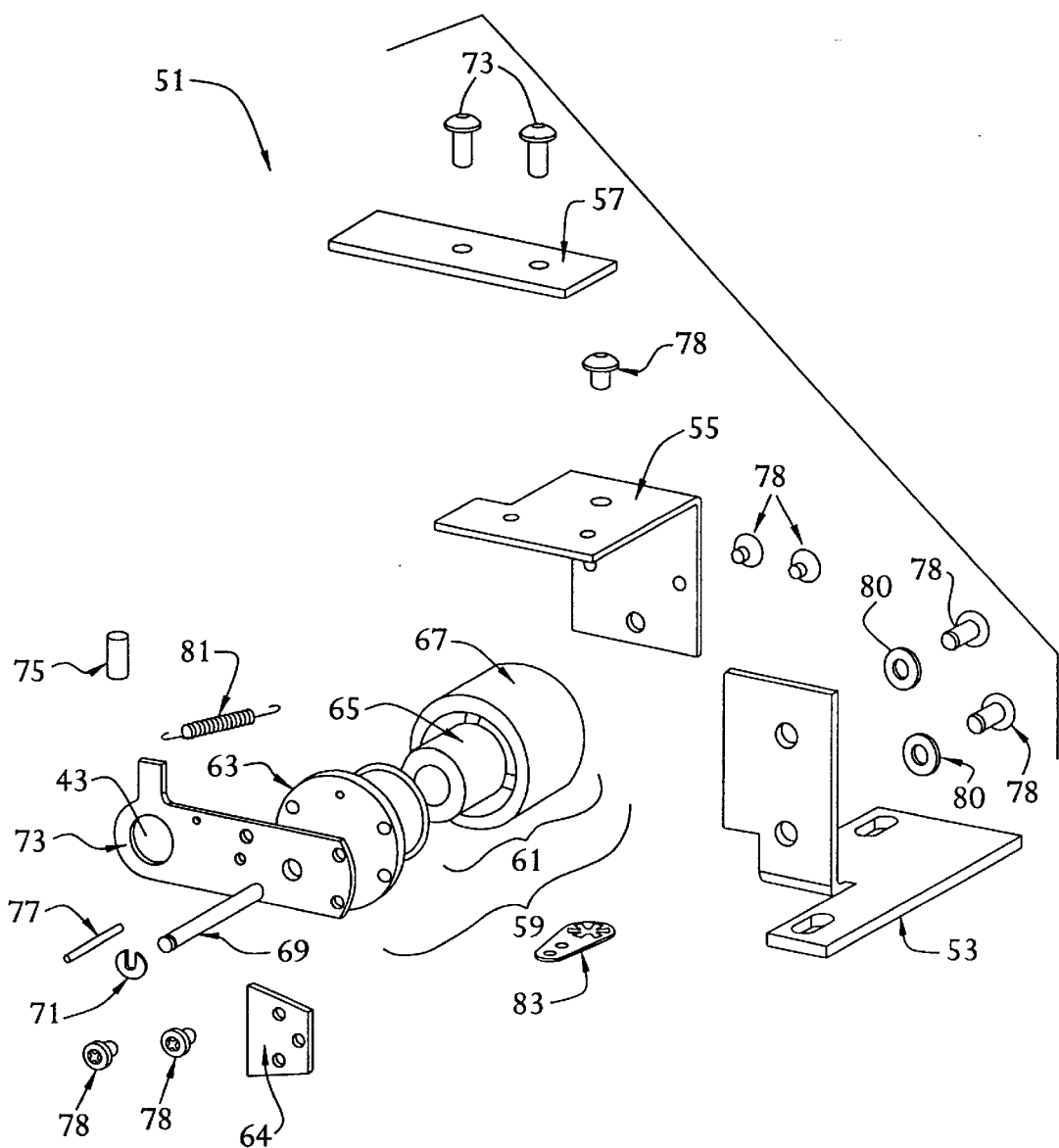
FIG. 6 is an exploded view of the preferred embodiment.

Also referring to the exploded view shown in FIG. 6, the basic structure of the laser focusing system 51 is comprised of a mounting bracket 53 which affixes the system securely to the plinth 35 in the laser barcode scanner 33 and a support bracket 55 for a position transducer board 57. A linear actuator 59 provides the electromotive force which comprises a magnet structure 61 and coil 63 with two leads (+) amd (-). The magnet structure 61 includes a pole piece 65 preferably made of neodymium and a magnetic steel shell 67. The coil 63 is formed by winding fine insulated wire on a bobbin preferably made of a self-lubricating plastic. The bobbin is slidably disposed along a support rod 69 with one end rigidly affixed to the rear of the shell 67. A circlip 71 positioned at the free end of the support rod 69 captures the coil 63 and lens support 73 assembly and limits free travel. Rigidly affixed to the coil 63 is a lens support 73 which also includes a small magnet 75. The magnet 75 is bonded to the lens support 73 and positioned selectively beneath the position transducer board 57. A supplemental support rod 77 having one end fastened to the steel shell 67 prevents free rotation of the lens support 73 and coil 63 around the support rod 69 by passing through the lens support 73. The magnet 75 provides a friction free coupling between the lens support 73 and position transducers 79a, 79b mounted to the underside of the position transducer board 57. A small helical spring 81 hooked between an aperture in the lens support 73 and a lug 83 fastened to the support bracket 55 biases the lens support 73 against the supplemental support rod 77 to prevent the lens 43 from moving perpendicular with respect to the optical axis. The coil used in the preferred embodiment has an impedance of 8 Ohms and operates between 0–8 Vdc. The coil 63 leads are attached to a terminal board 64. Miscellaneous capscrews 78 and washers 80 fasten the individual components into a compact assembly.

Figure 7A:
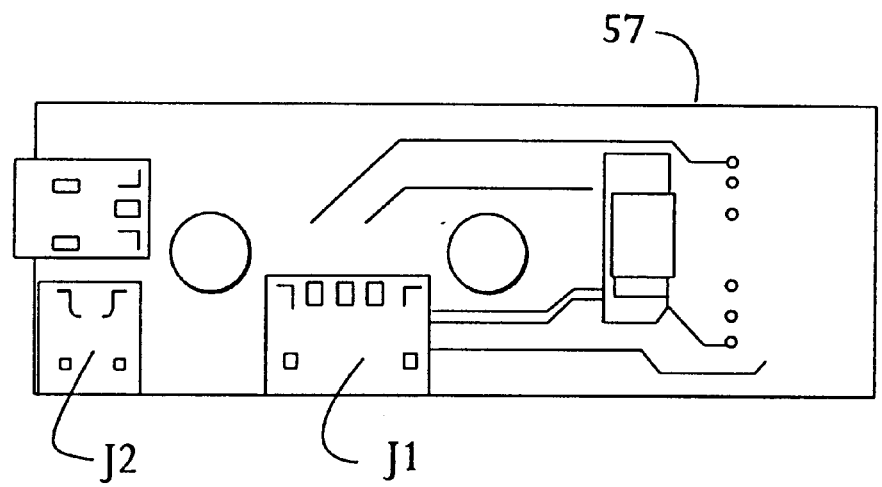
FIG. 7A is a top view of the position transducer board.
Figure 7B:
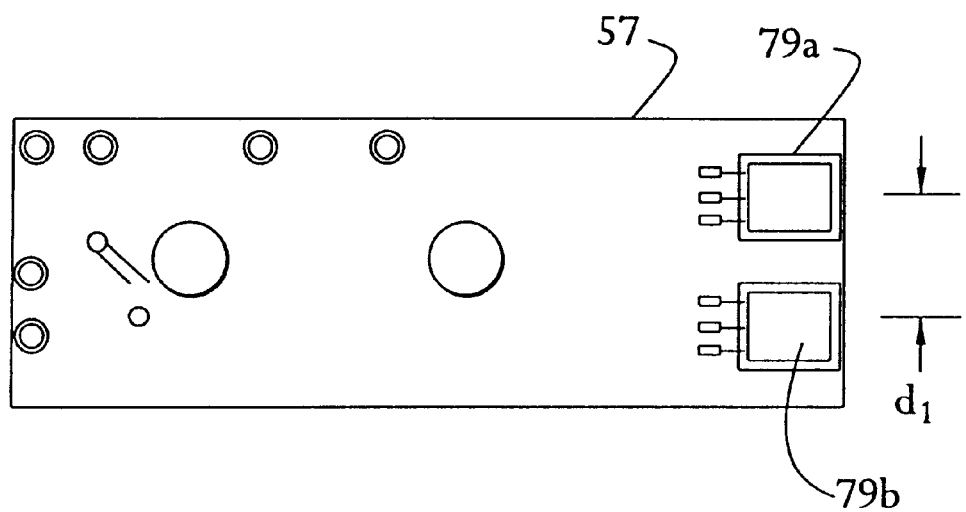
FIG. 7B is a bottom view of the position transducer board.

Referring to FIGS. 7A–7B, the position transducer board 57 is comprised of a printed-circuit board with two Hall effect magnetometers 79a, 79b mounted to the underside which provide coil 63 position feedback. One Hall effect transducer 79a is used for the minimum coil 63 excursion, the other transducer 79b is used for the maximum excursion.

The Hall effect is the production of a transverse voltage in a current-carrying conductor in a magnetic field. The magnetic field is supplied by the magnet 75 affixed to the lens support 73 shown in FIG. 6. The Hall effect transducers 79a, 79b typically have three connection terminals for input power, (+) and (-), and an analog voltage signal output. Two small connectors J1 and J2 couple the Hall effect transducers 79a, 79b and coil 63 to the control system 85. The small magnet 75 couples the position of the lens support 73 to the Hall effect transducers 79a, 79b. The gap between the 75 magnet and the Hall effect transducers 79a, 79b is optimized so the resultant difference signal (position) is linear over the range of travel. The distance $d_1$ between the Hall effect transducers is 10 mm providing for the maximum excursion of the coil 63 which in turn determines the minimum and maximum focus distances.

Figure 8:
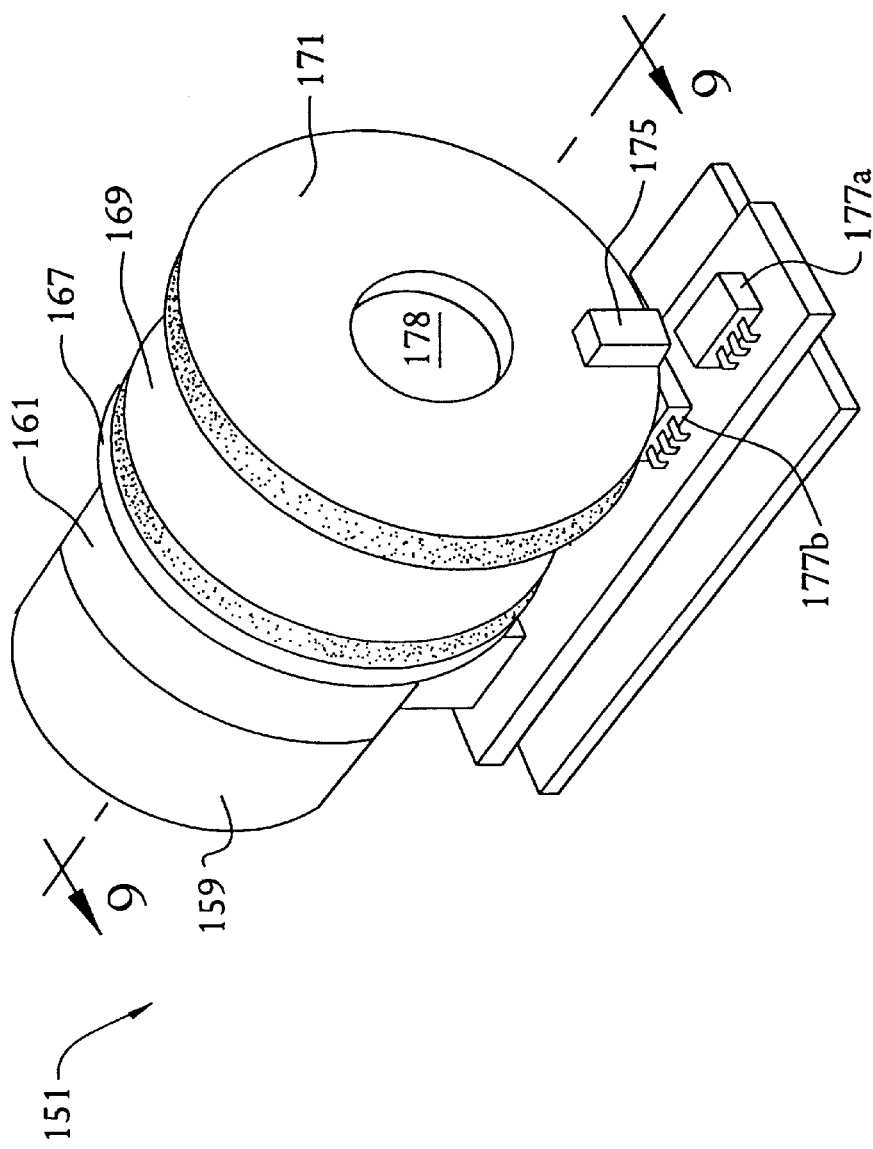
FIG. 8 is a perspective view of an alternate embodiment.
Figure 9:
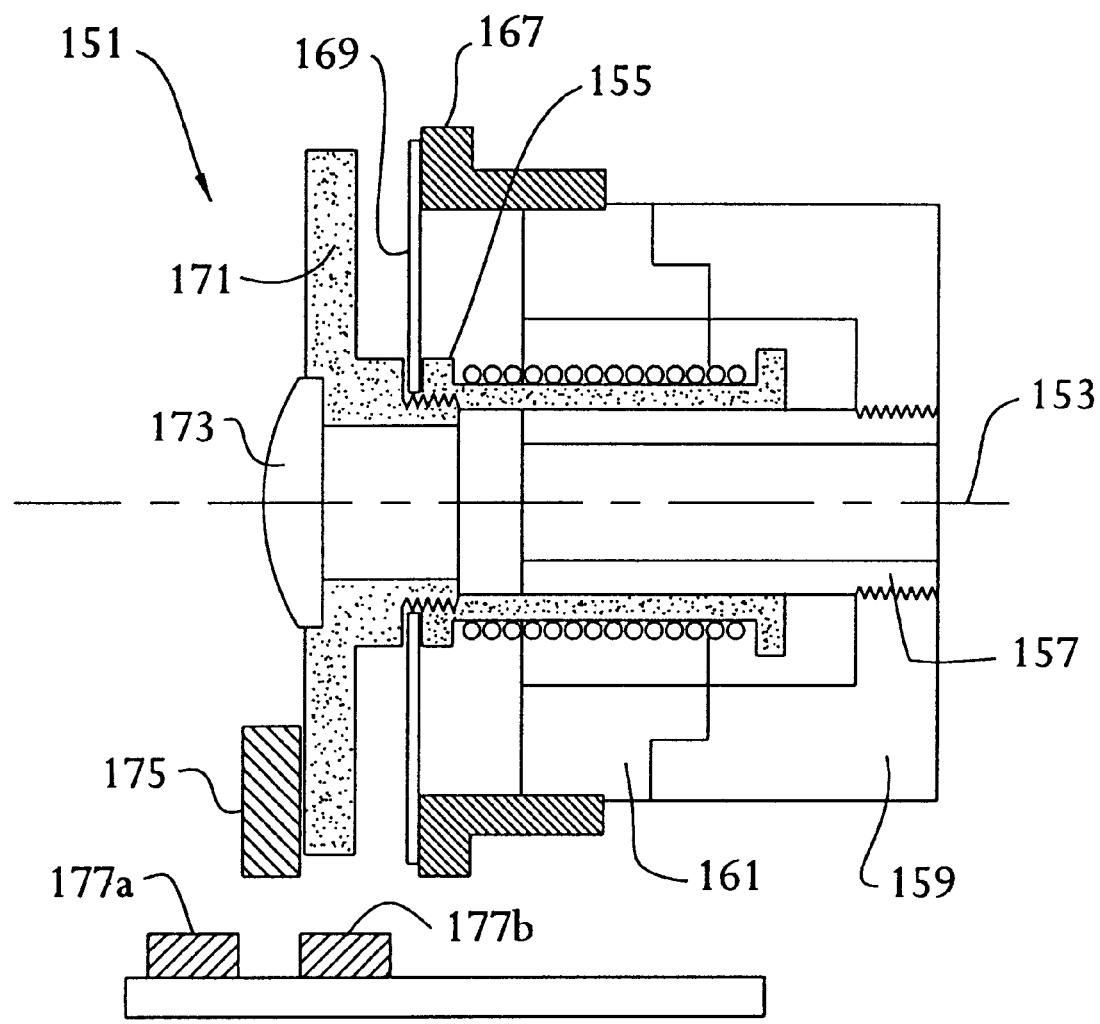
FIG. 9 is a section view along line 9—9 in FIG. 8.

Referring to FIGS. 8–9, an alternative embodiment 151 of the invention 51 is shown. This embodiment uses a coil 155 with a large internal diameter which is slidably disposed on an open, magnetic steel cylindrical support 157 enclosing the optical light path 153 within the assembly 151. A magnetic steel cup 159 and a cylindrical sleeve magnet 161 comprise a magnetic structure 165. The cylindrical support 157 screws into the steel cup 159 completing the magnetic assembly 165. The cylindrical magnet 161 has an outside thread that receives a diaphragm holder 167. The diaphragm holder 167 has mounted thereon a diaphragm membrane 169 having a center aperture which is captured between the coil 153 and a lens support 171. Both the lens support 171 and coil 155 have mating threads securing both parts to the diaphragm 169. The diaphragm 169 prevents free rotation around the optical axis and combines the function of the small helical spring 81 and supplement support rod 77 of the previously described embodiment. The diaphragm 169 also centers the assembly in the null position when the coil 155 is deenergized. Mounted on the lens support 171 is a lens 173 and a small magnetic 175 to actuate the position transducer comprising two Hall effect transducers 177a, 177b.

Figure 10:
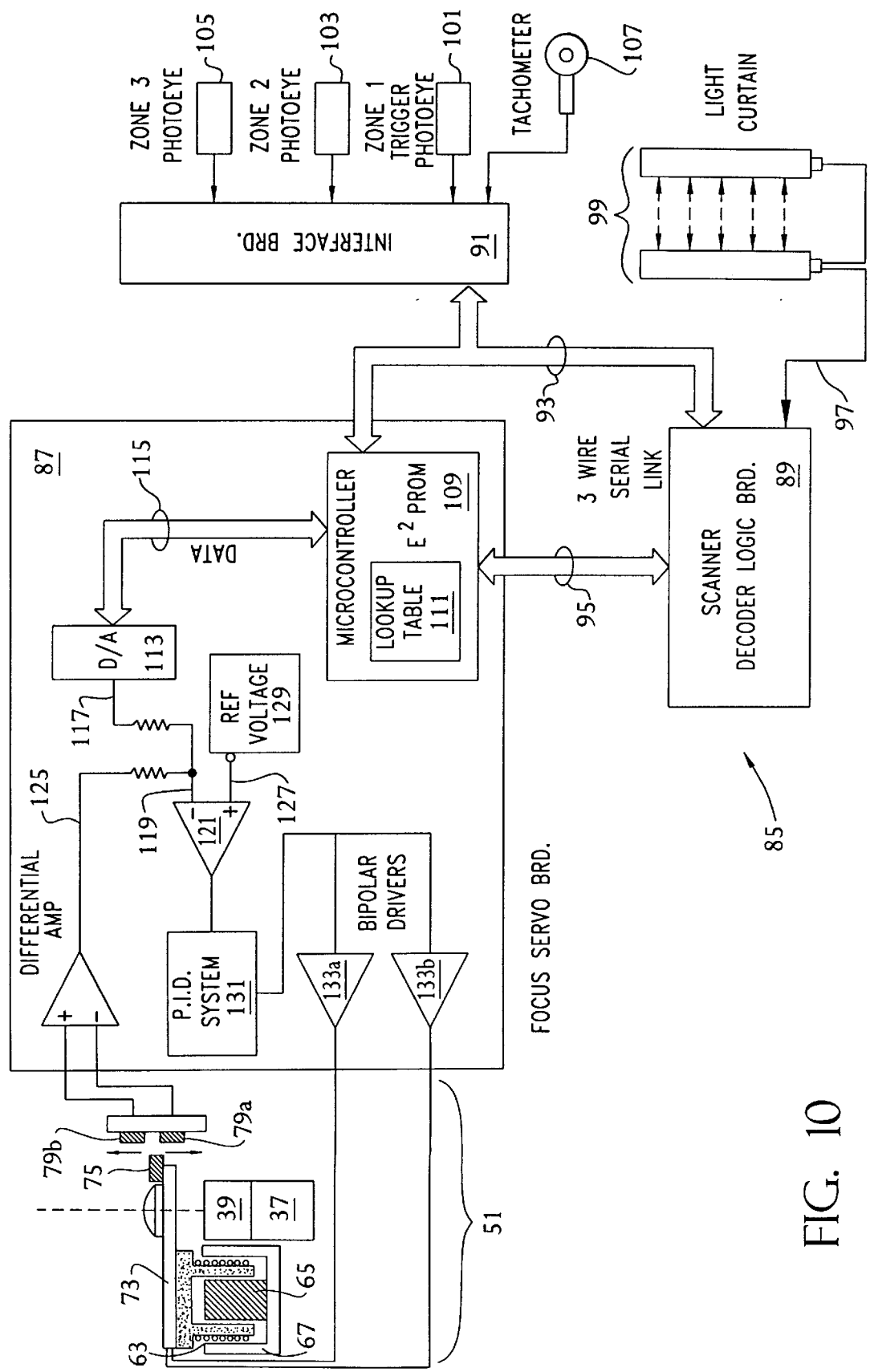
FIG. 10 is a block diagram of the control system.

Referring to FIG. 10, the control system 85 for the preferred embodiment is shown. As described above, the linear actuator 59 moves the lens support 73 which varies the position of the focusing lens thereby changing the effective focal length of lens assembly 39. The laser module contains the laser diode assembly 37 and the multi-element optics array 39.

The control system 85 electronics include three sub-assemblies: 1) a focus servo board 87; 2) a scanner decoder logic board 89; and 3) an interface board 91. The focus servo board 87 generates the bipolar drive for the coil 63 and receives the feedback signal from the Hall effect transducers 79a, 79b.

The scanner decoder logic board 89 communicates with the focus servo board 87 and the interface board 91 over a common communication ribbon cable 93. The scanner decoder logic board 89 also communicates with the focus servo board 87 over a three wire serial cable 95. The concepts of serial and parallel communication protocols are well understood by those familiar with this art and will not be discussed. The scanner decoder logic board 89 accepts an RS232 serial input 97 from a light curtain 99.

The interface board 91 accepts inputs from three photo-eyes 101, 103, 105 that define three discrete zones of barcode scanning distance. An input from a tachometer 107 provides object scanning speed.

Three different focusing modes are employed in the preferred embodiment. They are: 1) zone focus; 2) incremental focus; and 3) high resolution focus. As shown in FIGS. 9A–9B, the zone focus embodiment does not use a light curtain. The system divides the scanning height into three prefocused zones, determined by dividing the distance from maximum object scanning height to the minimum object height by 3. Two photoeyes 103, 105, are placed above the scanning surface at the ⅓ and ⅔ height locations, where each determines the second and third zone respectively. One object detection and zone latch photoeye 101 is positioned near scanning surface, vertically offset O from the other photoeyes 103, 105. The first scanning zone is determined by exclusion if the trigger photoeye 101 detects an object but the zone 2 103 and zone 3 105 photoeyes do not.

Upon system start-up and calibration, the maximum focusing distance is set at the minimum object height. The minimum focusing distance is set at the maximum object height and becomes the top of zone 3. Once the minimum and maximum focusing distances are calibrated, the system computes the distance and divides by 6 and stores lens positions for the ⅙, ½, and ⅚ distances corresponding to zones 1, 2 and 3 respectively. When an object on the scanning surface moves to the scanning area, the zone 2 or 3 photoeyes 103, 105 will be interrupted first dependent upon object height. The height value will be entered and then latched in when the object interrupts the trigger photoeye 101 thereby initiating a scan. For example, when an object interrupts the zone 2 photoeye 103, the system 51 immediately positions the lens at the ½ height distance. Zone focusing for zones 1 and 3 operate similarly. Each depth of field associated with each prefocused zone slightly overlaps the next to accurately read barcodes on objects having an irregular top surface.

Figure 11A:
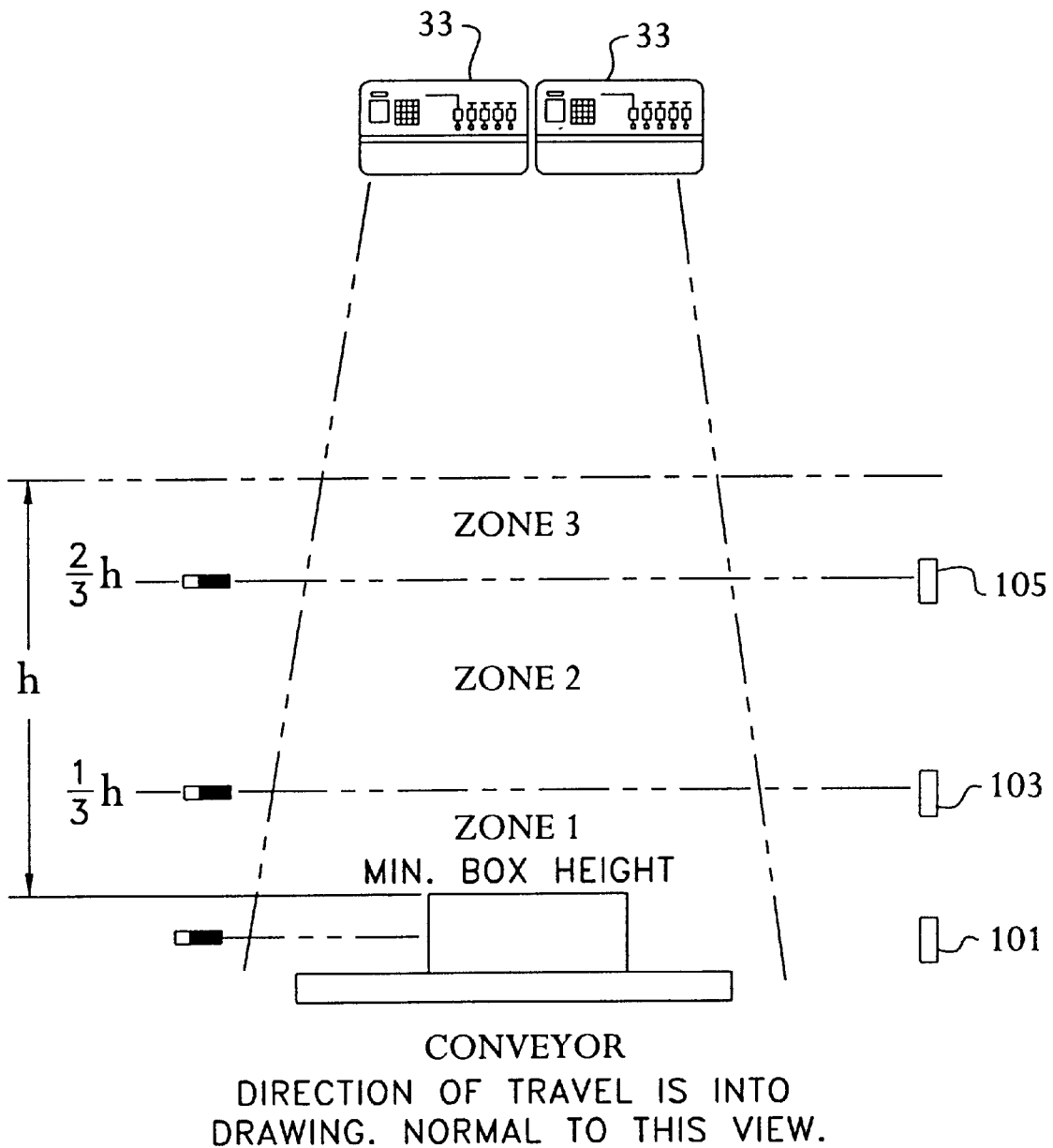
FIG. 11A is a front view of a four zone scanning system in position above a conveyor.
Figure 11B:
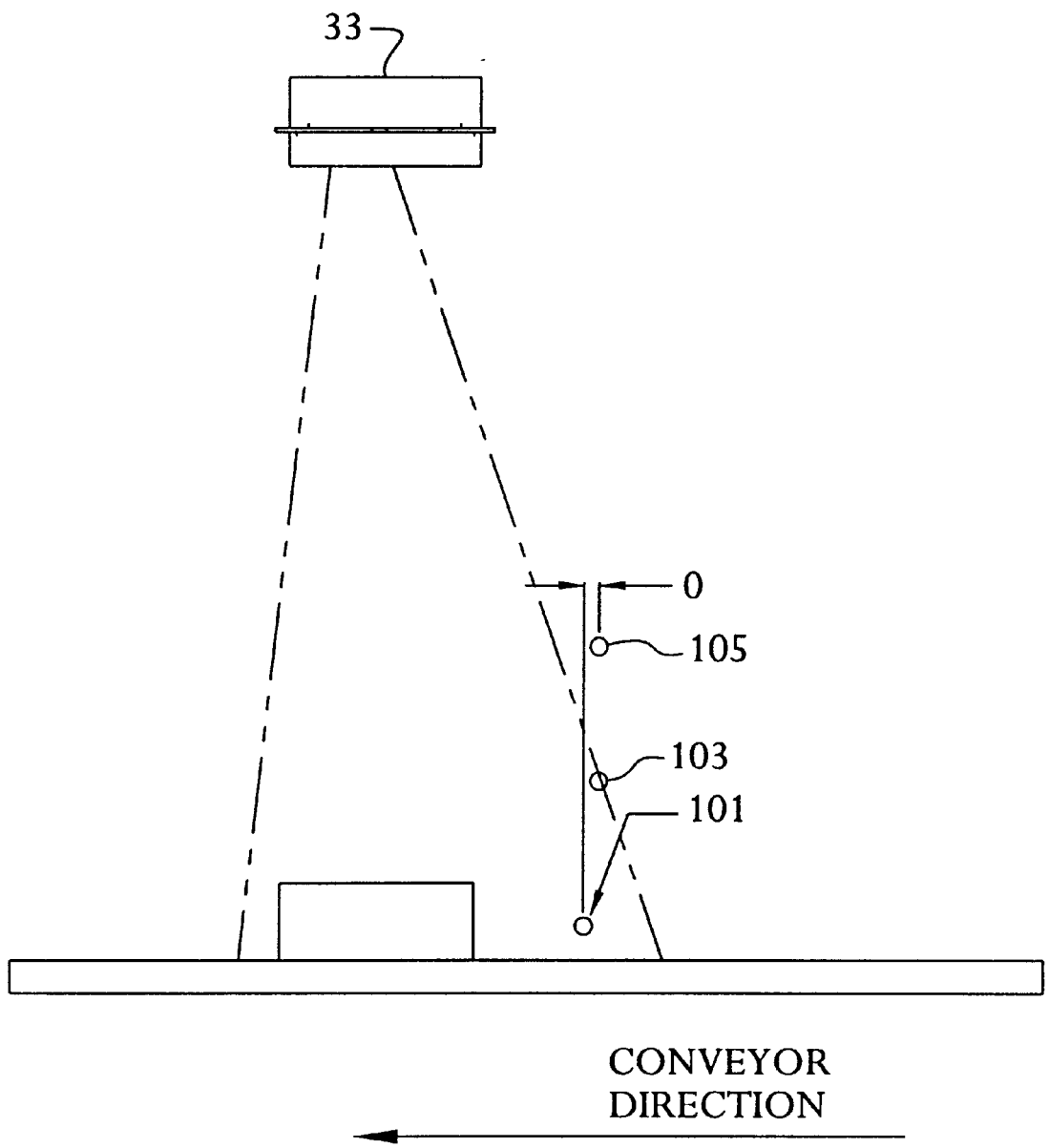
FIG 11B is a side view of a four zone scanning system in position above a conveyor.
Figure 12:
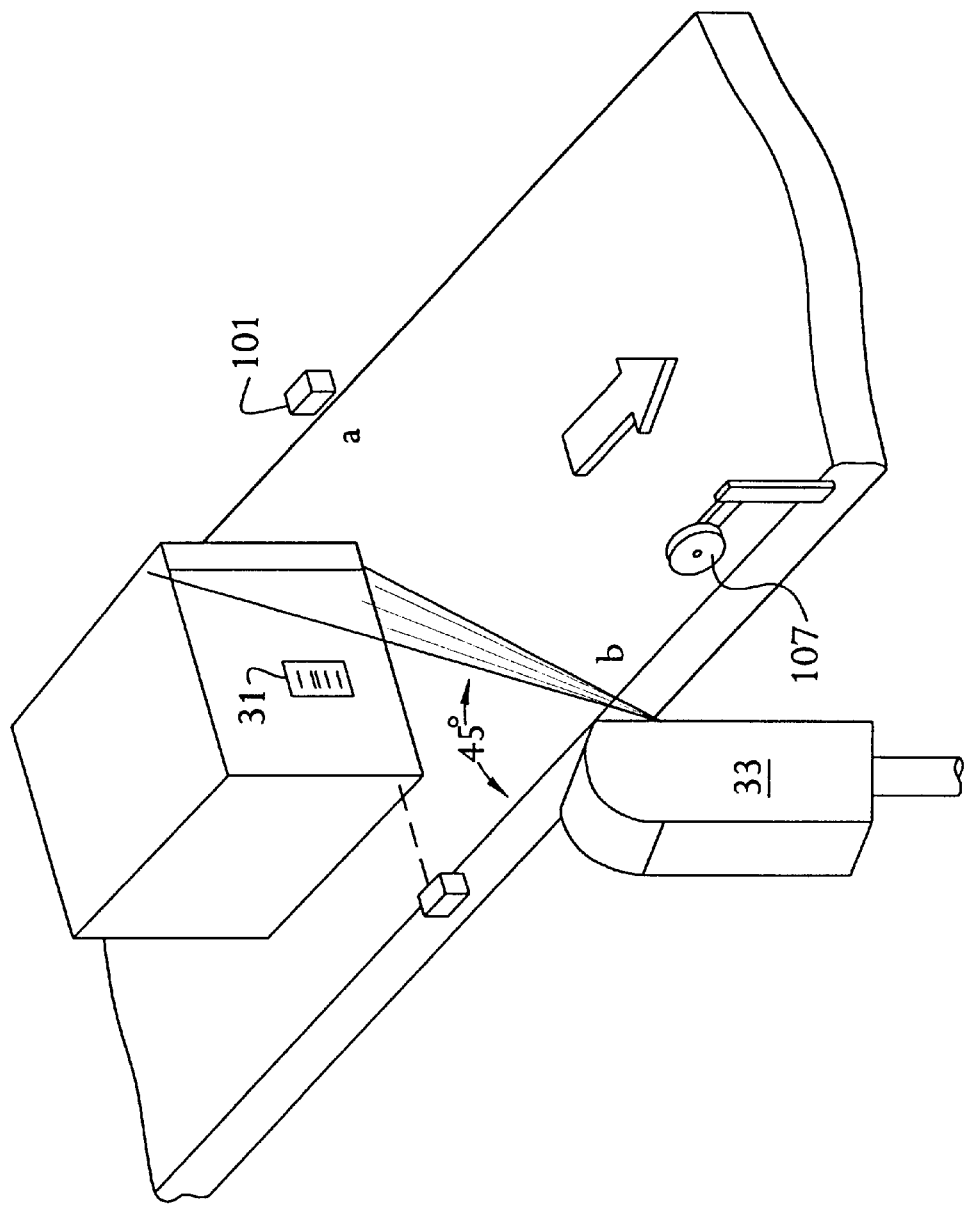
FIG. 12 is a simplified, perspective view of an incremental focusing scanning system.
Figure 13A:
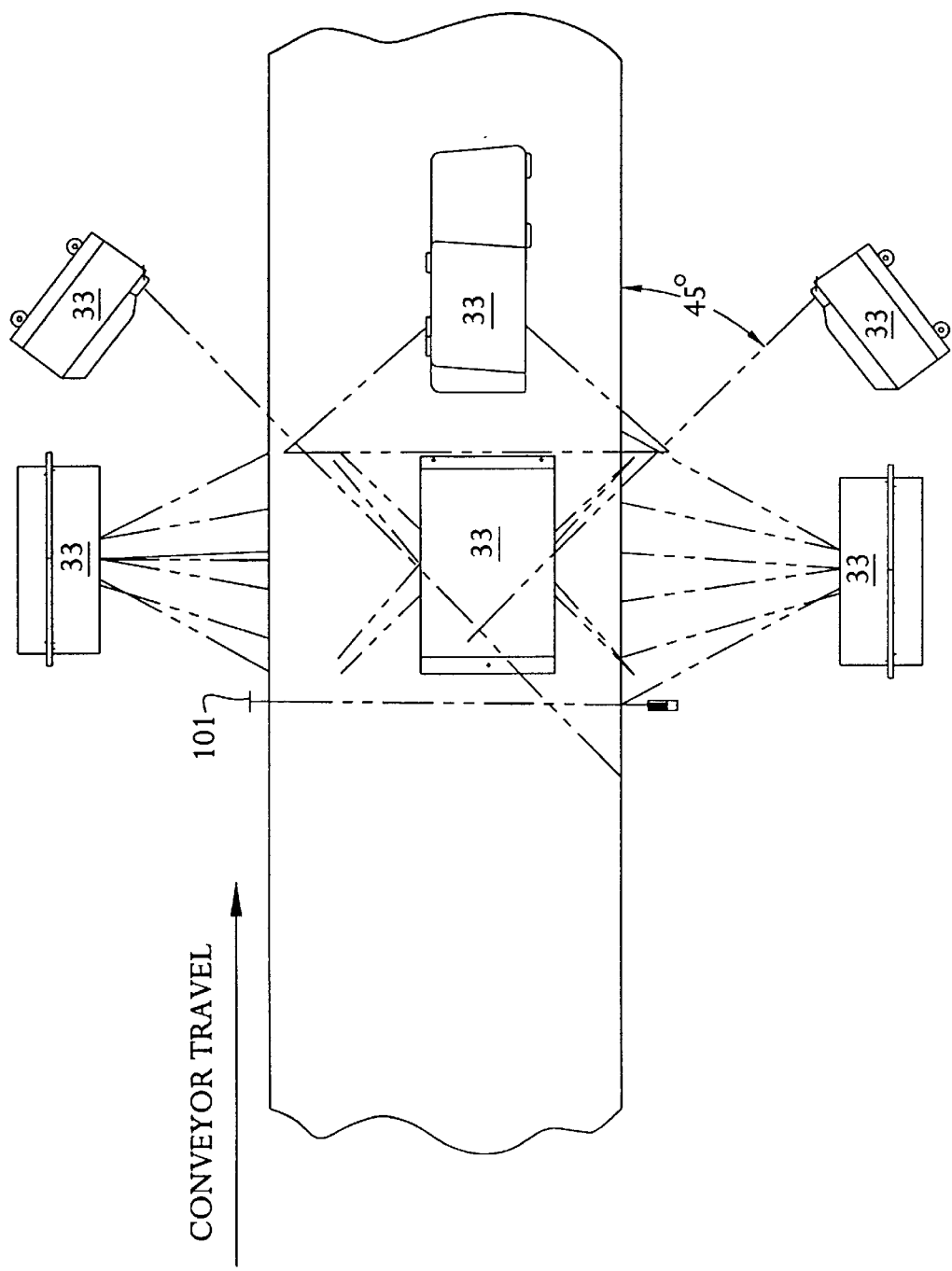
FIG. 13A is a side view of an incremental focusing scanning system in position above a conveyor.
Figure 13B:
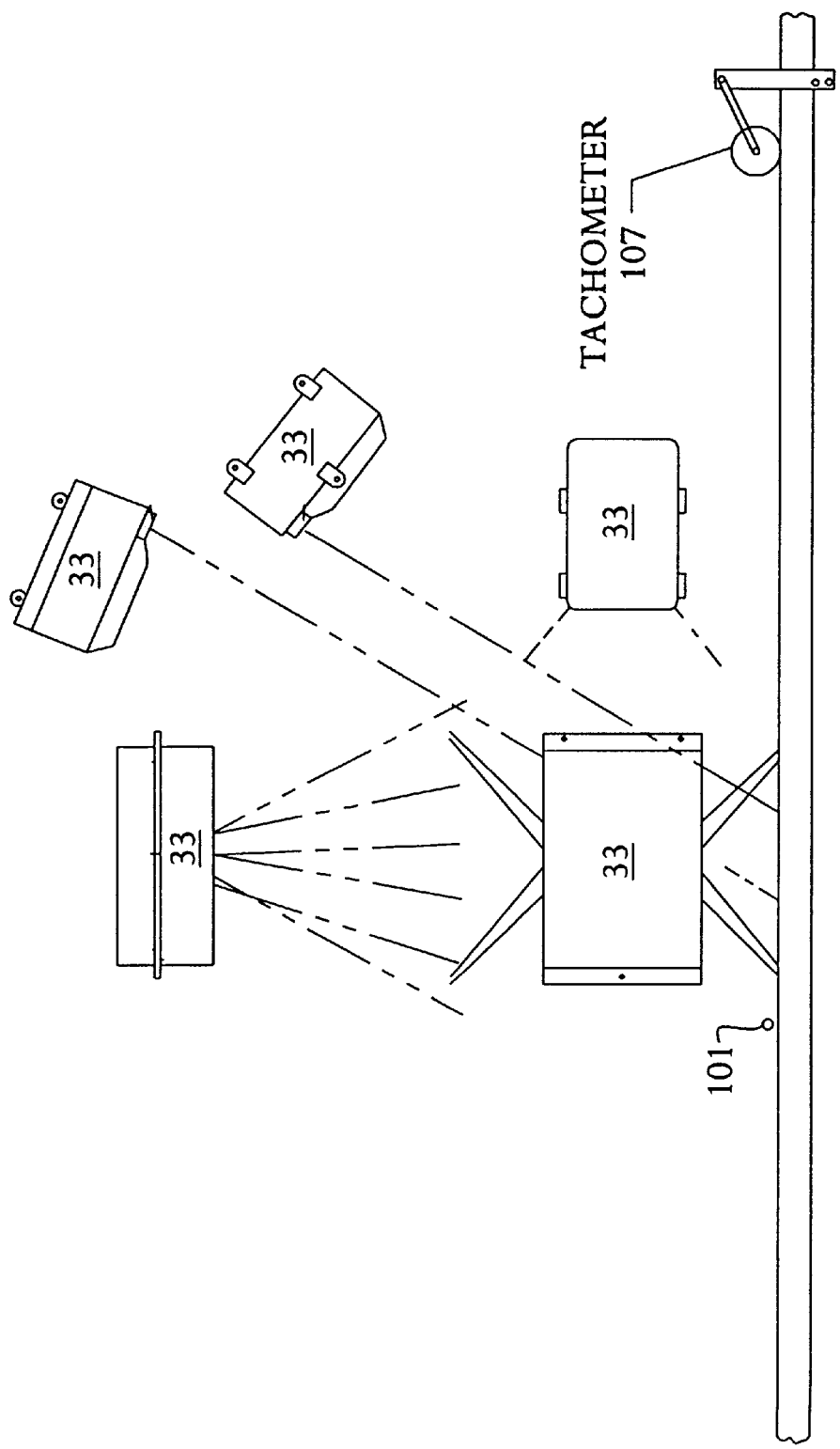
FIG. 13B is a side view of an incremental focusing scanning system in position above a conveyor.

A simplified arrangement of the incremental focus embodiment is shown in FIG. 10. A side mounted scanner with a vertical scanning beam is oriented at a 45° angle with the conveyor directional travel. An apparent horizontal scan is created as the object moves forward through the scanning area into the scanning beam. When the object passes point a, the trigger photoeye 101 initiates the scanning system and defaults the focusing system to the maximum, pre-focused distance. The tachometer 107 inputs the object speed to the lens positioning system 51 which strokes the movable lens element 43 from the maximum focusing distance to the minimum focusing distance in direct calibrated response to the object speed. This insures that the laser is optimally focused across the entire width of the object. The complete development of the incremental focus embodiment is shown in FIGS. 11A–11B. The system relies on four line scanners to capture a barcode on the front of an object, and three x-line scanners are positioned above and at each side. One scanner 33 is positioned at a 45° angle with respect to the scanning surface and oriented against the direction of object travel. This scanner 33 reads barcodes on the front of the object. The second and third scanners 33 are mounted on the left and right side of the scanning surface similarly positioned at a 45° angle with respect to the sides of the object and oriented in the direction of travel. The fourth scanner 33 similarly is positioned at a 45° angle with respect to the top of the object.

The high resolution focus embodiment uses the light curtain 99 which can resolve an object height to ¼ of an inch. The scanner decoder logic board 89 reformats the asynchronous serial input 97 to a synchronous serial output 95. The serial communication link 95 transfers the height measurement of an object from the scanner decoder logic board 89 to a microcontroller 109 located on the focus servo board 87. The object height information from the light curtain 99 is input to an EEPROM look-up table 111 resident in the microcontroller 109. The look-up table 111 in conjunction with the microcontroller 109 provides a translation between the digitized height measurement and a digital lens position. The output from the look-up table 111 is an 8-bit digital value having a resolution of 255 discrete steps.

The linear actuator 59 is operated bipolar, having a null or 0 voltage position corresponding to $01111111_2$ (127) positioning the lens midway between the minimum and maximum focusing distances. The output of the look-up table 111 is coupled to a digital to analog converter 113 (DAC) over a parallel bus 115. The DAC 113 converts the digital look-up table 111 values into analog voltages which are coupled to a non-inverting input 119 of an operation amplifier configured as a summing amplifier 121. Also coupled to the same node 119 is the corrective feedback 125 from the position transducers 79a, 79b. The non-inverting input 127 of the summing amplifier 121 is connected to a precision voltage reference 129. The sum or difference between the inverting 119 and non-inverting 127 inputs of the summing amplifier 121 are output to a proportional-integral-derivative (PID) controller 131.

To one skilled in the art of controls, it is known to pair a process variable (output lens position) with a manipulated variable (desired lens position) and insert a PID controller 131. For closed-loop control, feedback is added from the position transducers 79a, 79b. The position transducer corresponding to the minimum focusing distance 79a is connected to an inverting input of an operational amplifier configured as a differential amplifier 135. The non-inverting input to the differential amplifier 135 is connected to the position transducer corresponding to the maximum focusing distance 79b. The differential amplifier 135 amplifies the difference voltage between the non-inverting and inverting input signals. The output 125 of the differential amplifier 135 is entirely independent of the individual input signal levels. Only the difference between the input signal levels is amplified. The output 125 of the differential amplifier 135 provides the corrective feedback for the control system 85.

The output of the look-up table 111 provides the set point for the control system 85. The summation of the set point and feedback is modified by the PID controller 131 to minimize over and undershooting and to insure system stability. The control loop is tuned by adjusting the gain (P), reset rate (I), and rate (D) of the controller 131 empirically upon start-up. The output of the PID controller 131 is coupled to two bipolar drivers 133a, 133b which generate the voltage signal to the coil 63. The output of the differential amplifier is summed with the output of the DAC 113 and provides the feedback, or disturbance to the control system.

The system 85 is calibrated by connecting a personal computer (PC) (not shown) to the focus servo board 87 via the serial communications link 95. A program resident on the personal computer downloads a formatted focus table to the EEPROM look-up table 111 resident on the microcontroller 109. The look-up table 111 equates step values from 0–255 to lens positions or image distances corresponding to the desired object distance range. Since the individual Hall sensors 79a, 79b will vary in sensitivity, each response characteristic will require normalization to match the linear model which relates x number of inches (distance) per step (lens excursion). Since the lens position feedback signal 125 is summed with the DAC 113 output 117, either value can be varied to elevate the lower value or suppress the upper value. Adjustment potentiometers (not shown) allow for the adjustment of the upper (255) and lower (00) reference voltages to the DAC 113 to adjust the output characteristics.

Calibration for the zone focus embodiment requires entering the object distance values for the scanning surface, zone 2 and zone 3. Calibration for the incremental focus embodiment is performed for the maximum object distance or idle distance and the final focus position or end position. Since the high resolution focus embodiment requires a light curtain 99, calibration is minimized in accordance with the ASCII message from the light curtain to the logic board. The message from the light curtain 99 corresponds for each 0.25 inch over 36 inches thereby yielding 144 discrete messages.

The preferred embodiment illustrates the use of the invention for a projecting beam application. However, one skilled in the art can readily appreciate the use of the invention beyond projecting beam applications and into image reception.

While specific embodiments of the present invention have been shown and described, many modifications and variations could be made by one skilled in the art without departing from the spirit and scope of the invention. The above description serves to illustrate and not limit the particular form in any way.

We claim:

1. A scanner for reading coded symbologies on an object comprising:

means for periodically illuminating a scanning region;

means for detecting light reflected from said scanning region;

means for determining at least one linear dimension of an object disposed within said scanning region; and focusing means including a movable lens and a linear actuator for moving said lens to focus illumination in said scan region in response to said previously determined linear dimension;

said focusing means comprising a first support bracket providing a foundation for said focusing means;

a second support bracket for securing a lens position sensing means;

a first magnetic element connected with said second support bracket and defining a cylinder;

means fastening said second support bracket to said first support bracket;

a coil slidably disposed with said cylinder of said first magnetic element;

a lens support for securing said movable lens to said coil; and a second magnet element affixed to said lens support in close proximity to said lens position sensing means.

2. The apparatus according to claim 1 wherein said lens position sensing means further comprise two Hall effect transducers mounted on a board with said transducers separated by a preselected distance for providing correctional feedback during said lens movement.

3. The apparatus according to claim 2 wherein said Hall effect transducers are actuated by said second magnet element.

4. The apparatus according to claim 3 wherein said scanning region is defined as an area of a moving conveyor whereupon said means for illumination falls.

5. The apparatus according to claim 4 further includes a control means comprising:

a microcontroller having a memory, an output, and an input from said linear dimension means;

said memory storing a table relating object heights to output voltage values;

a differential amplifier for accepting said correctional feedback from said Hall effect transducers; and a proportional-integral-derivative (PID) controller accepting said correctional feedback and said output voltage values and outputting a controlled bipolar output signal in dependance upon said PID controller tuning for energizing said coil.

6. The apparatus according to claim 5 wherein said linear dimension determining means further comprises:

a scanner decoder logic circuit that accepts inputs from a light curtain and outputs a signal proportional to the object height to said microcontroller;

said microcontroller outputs said output voltage values from said table in dependence upon said signal input from said scanner decoder logic circuit.

7. The apparatus according to claim 5 wherein said linear dimension determining means further comprises:

an interface logic circuit that accepts inputs from a plurality of photosensors and outputs signals representing specific object height measurements to said microcontroller;

said microcontroller outputs said output voltage values from said table in dependence upon said signal input from said interface logic circuit.

8. The apparatus according to claim 7 wherein said linear dimension determining means further comprises:

an interface board accepting inputs from a photosensor and a tachometer and outputs signals to said microcontroller;

said photosensor outputting a signal representing an object intercepting said scanning region;

said tachometer outputting a signal representing said scanning region velocity;

said microcontroller outputting a continuous, ramping voltage from said table in dependence upon said tachometer signal from said interface logic circuit representing focusing distances related to said scanning region velocity.

9. The apparatus according to claim 1 wherein said focusing means further comprises:
- a cup providing a foundation for said focusing means having a center aperture;
- a first magnetic element coupled with said cup defining a first open cylinder;
- a second open cylinder disposed and centered within said first open cylinder secured to said cup;
- a coil slidably disposed with said second open cylinder;
- a diaphragm affixed between said first magnetic element and said coil limiting travel of said coil on said second open cylinder;
- a lens support for securing said moveable lens to said coil; and
- a second magnetic element affixed to said lens support in close proximity to a lens positioning sensing means.

10. The apparatus according to claim 9 wherein said lens position sensing means further comprise two Hall effect transducers mounted on a board with said transducers separated by a preselected distance for providing correctional feedback during said lens movement.

11. The apparatus according to claim 10 wherein said Hall effect transducers are actuated by said second magnet element.

12. The apparatus according to claim 11 wherein said scanning region is defined as an area of a moving conveyor whereupon said means for illumination falls.

13. The apparatus according to claim 12 further includes a control means comprising:
- a microcontroller having a memory, an output, and an input from said linear dimension means;
- said memory storing a table relating object heights to output voltage values;
- a differential amplifier for accepting said correctional feedback from said Hall effect transducers; and
- a proportional-integral-derivative (PID) controller accepting said correctional feedback and said output voltage values and outputting a controlled bipolar output signal in dependance upon said PID controller tuning for energizing said coil.

14. The apparatus according to claim 13 wherein said linear dimension determining means further comprises:
- a scanner decoder logic circuit that accepts inputs from a light curtain and outputs a signal proportional to the object height to said microcontroller;
- said microcontroller outputs said output voltage values from said table in dependence upon said signal input from said scanner decoder logic circuit.

15. The apparatus according to claim 13 wherein said linear dimension determining means further comprises:
- an interface logic circuit that accepts inputs from a plurality of photosensors and outputs signals representing specific object height measurements to said microcontroller;
- said microcontroller outputs said output voltage values from said table in dependence upon said signal input from said interface logic circuit.

16. The apparatus according to claim 13 wherein said linear dimension determining means further comprises:
- an interface board accepting inputs from a photosensor and a tachometer and outputs signals to said microcontroller;
- said photosensor outputting a signal representing an object intercepting said scanning region;
- said tachometer outputting a signal representing said scanning region velocity;
- said microcontroller outputting a continuous, ramping voltage from said table in dependence upon said tachometer signal from said interface logic circuit representing focusing distances related to said scanning region velocity.

17. A scanner for reading coded symbologies on an object comprising:
- means for periodically illuminating a scanning region;
- means for detecting light reflected from said scanning region;
- means for determining at least one linear dimension of an object disposed within said scanning region; and
- a focusing means including a movable lens and a linear actuator for moving said lens to focus illumination in said scan region in response to said previously determined linear dimension;
- said focusing means comprising
- a first support means providing a foundation for said focusing means;
- a second support means for securing a lens position sensing means;
- a first magnetic element connected with said second support means and defining a cylinder;
- means fastening said second support means to said first support means;
- a coil slidably disposed with said cylinder of said first magnetic element;
- a lens support for securing said movable lens to said coil; and
- a second magnet element affixed to said lens support in close proximity to said lens position sensing means.

* * * * *